United States Patent
Parada, Jr. et al.

(10) Patent No.: US 8,134,539 B2
(45) Date of Patent: Mar. 13, 2012

(54) DIGITAL PICTURE FRAME HAVING NEAR-TOUCH AND TRUE-TOUCH

(75) Inventors: Robert J. Parada, Jr., Rochester, NY (US); Lawrence B. Landry, Victor, NY (US); John R. Fredlund, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 533 days.

(21) Appl. No.: 12/413,790

(22) Filed: Mar. 30, 2009

(65) Prior Publication Data
US 2010/0245263 A1 Sep. 30, 2010

(51) Int. Cl.
*G06F 3/041* (2006.01)
(52) U.S. Cl. ........................... 345/173; 345/156
(58) Field of Classification Search .......... 345/156–173; 715/716
See application file for complete search history.

(56) References Cited

U.S. PATENT DOCUMENTS

| | | | |
|---|---|---|---|
| 6,351,556 B1 | 2/2002 | Loui et al. | |
| 6,971,072 B1 | 11/2005 | Stein | |
| 7,248,248 B2 | 7/2007 | Lampson | |
| 7,676,767 B2 * | 3/2010 | Hofmeister et al. | 715/863 |
| 2001/0015762 A1 * | 8/2001 | Suzuki et al. | 348/333.05 |
| 2004/0032400 A1 * | 2/2004 | Freeman et al. | 345/173 |
| 2006/0001650 A1 * | 1/2006 | Robbins et al. | 345/173 |
| 2006/0097990 A1 * | 5/2006 | Izumi | 345/173 |
| 2006/0161871 A1 | 7/2006 | Hotelling et al. | |
| 2006/0284852 A1 * | 12/2006 | Hofmeister et al. | 345/173 |
| 2007/0040810 A1 * | 2/2007 | Dowe et al. | 345/173 |
| 2007/0081643 A1 * | 4/2007 | Divine | 379/100.01 |
| 2008/0143890 A1 * | 6/2008 | Rosencwaig et al. | 348/836 |
| 2009/0070675 A1 * | 3/2009 | Li | 715/716 |
| 2009/0091649 A1 * | 4/2009 | Anderson | 348/333.01 |
| 2009/0195554 A1 * | 8/2009 | Hu | 345/619 |
| 2009/0202123 A1 * | 8/2009 | Pan | 382/128 |
| 2009/0237372 A1 * | 9/2009 | Kim et al. | 345/173 |
| 2010/0017301 A1 * | 1/2010 | Alva | 705/26 |
| 2010/0295801 A1 * | 11/2010 | Bestle et al. | 345/173 |
| 2011/0001697 A1 * | 1/2011 | Mao | 345/157 |
| 2011/0043463 A1 * | 2/2011 | Kooh et al. | 345/173 |

OTHER PUBLICATIONS

Mitsubishi 3D Touch Panel Demonstrated, website article http://www.phsyorg.com/news156159930.html.

* cited by examiner

*Primary Examiner* — Nitin Patel
(74) *Attorney, Agent, or Firm* — Peyton C. Watkins (57) ABSTRACT

A digital picture frame includes a near-touch user interface component that senses when an object is within a predetermined spatial region of the digital picture frame; a true-touch user interface component that senses physical contact with the digital picture frame; and a processor that receives input signals from the near-touch user interface component and the true-touch user interface component and executes device controls based on inputs from both user interface components.

27 Claims, 10 Drawing Sheets

DIGITAL PICTURE FRAME HAVING NEAR-TOUCH AND TRUE-TOUCH

FIELD OF THE INVENTION

The present invention generally relates to digital picture frames and, more particularly, to such digital picture frames having both near-touch and true-touch user interface components.

BACKGROUND OF THE INVENTION

Currently, digital picture frames include a display in which images are displayed and a border for creating a decorative design and also functioning as a true-touch interface. The true-touch interface includes sensors which, when the border is touched, activate a designated mode of operation associated with the touched region; for example, play, fast forward, play in reverse order, and the like. Digital picture frames such as the Kodak® EASYSHARE® M820 Digital Frame with Home Decor Kit include this feature.

There are also true-touch displays currently available on kiosks. For example, the Kodak® Picture Maker includes true-touch displays in which the user presses against the display at the location of a particular icon to initiate the particular mode of operation associated with the region of the display (icon) the user has pressed. The Kodak® Picture Maker is used to create hardcopy pictures.

Although the presently known and utilized digital picture frames are satisfactory and successful, improvements are always desired. In particular, this invention ascertained that there is a desire for improvements in user interface design so that dominance of a single type of user interface modality does not limit the experience of the digital picture frame. For example, it is not always readily apparent to an inexperienced consumer how to activate and use the true-touch user interface of a current digital picture frame.

Consequently, a need exists for digital picture frames having multiple user interface modes for enhancing and/or simplifying the user experience.

SUMMARY OF THE INVENTION

The present invention is directed to overcoming one or more of the problems set forth above. Briefly summarized, according to one aspect of the invention, the invention resides in a digital picture frame comprising a near-touch user interface component that senses when an object is within a predetermined spatial region of the digital picture frame adjacent to the display surface; a true-touch user interface component adjacent to the display surface that senses physical contact with the digital picture frame; and a processor that receives input signals from the near-touch user interface component and the true-touch user interface component and executes device controls based on inputs from both user interface components.

These and other objects, features, and advantages of the present invention will become apparent to those skilled in the art upon a reading of the following detailed description when taken in conjunction with the drawings wherein there is shown and described an illustrative embodiment of the invention.

ADVANTAGEOUS EFFECT OF THE INVENTION

The present invention has the advantage of creating a more user-friendly digital picture frame by incorporating both a near-touch user interface component and a true-touch user interface component for enhancing and/or simplifying the user experience.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

Figure 1:
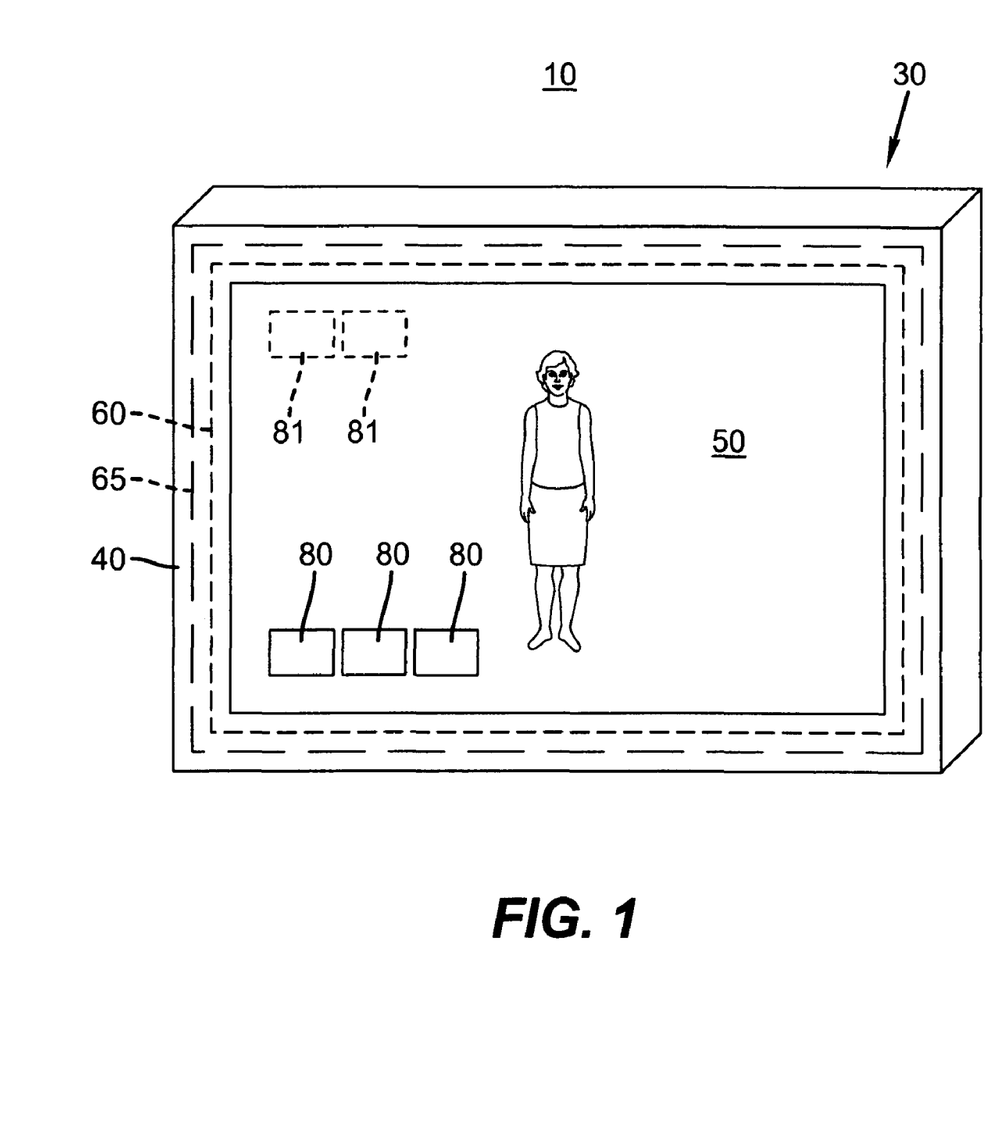
FIG. 1 is a front view of the digital picture frame of the present invention.
Figure 2:
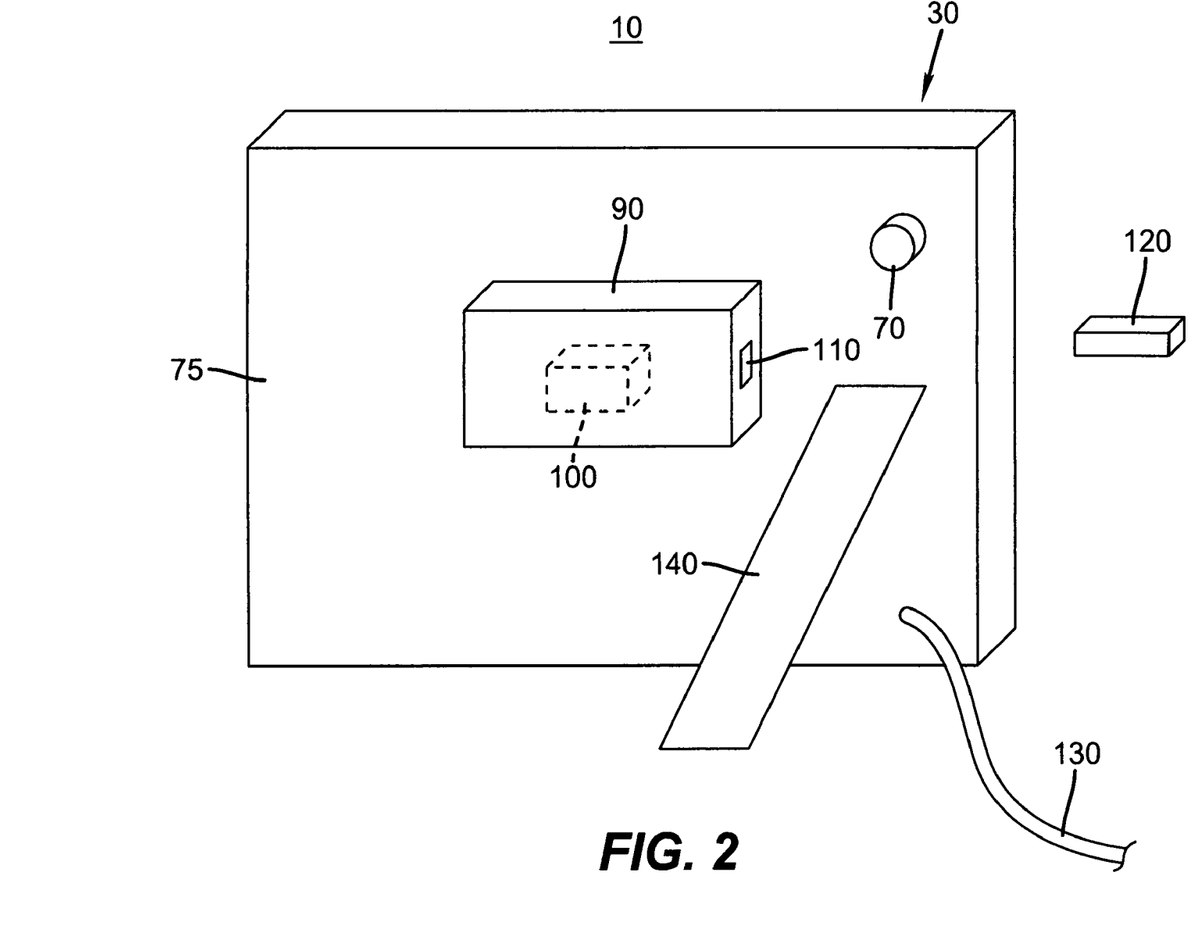
FIG. 2 is a back view of the picture frame of the present invention.

Referring to FIG. 1, there is shown a front view of the digital picture frame 10 of the present invention. The digital picture frame 10 includes a housing 30 that forms an enclosure that entirely encloses the side and back portions and that partially encloses the front portion, the periphery. The front portion 40 is referred to as a border, and it surrounds a display 50 (also commonly referred to as a panel or screen) on which images, icons, text and the like are displayed. A wire 60 is embedded within the housing 30 (preferably directly behind and in close proximity of the border 40), and the wire 60 senses when an appendage of a person is within a predetermined spatial region, preferably 1-2 longitudinal inches, of the border 40 and/or display 50. It is noted that the wire 60 senses a change in the electrical and/or magnetic field of the wire 60 when an object, usually when an appendage of a person, is within the predetermined distance. For instance, when an appendage of a person comes within a predetermined distance of wire 60, the absolute capacitance or the relative capacitance vs. the device background capacitance; or the relative capacitance vs. a second wire 65 is detected by processor 100. The second wire 65 is located between the main circuit board (not shown) and panel edge and wire 60. The processor 100 (see FIG. 2) can be the main processor on the device or alternatively a separate processor dedicated to the non-touch detection. The processor 100 is located within protruding portion 90 as shown in FIG. 2 or alternatively may be located in border 40 or within housing 30. Sometimes algorithms are applied to the change in capacitance signal to improve detection sensitivity. Triggering the near-touch sensor can be used to activate one or more processes, including but not limited to activating the touch sensors, activating LED lights or activating the panel backlight. This wire 60 forms a user interface component that is referred to herein as a near-touch user interface component. Although the preferred embodiment uses 1-2 inches as the predetermined spatial region, the predetermined spatial region may be adjusted by manipulating a user interface 70 (see FIG. 2), such as turning a knob in the preferred embodiment, which adjusts the electrical and/or magnetic field sensitivity.

It is noted that either the display 50 or the border 40 or both can contain the true-touch user interface component that permits one of a plurality of modes of operation images 80 to initiate activation of a mode when its location is touched. Examples of the modes of operation that relate to specific types of content include personal imaging content; entertainment content; and Infotainment content. It is noted that the mode images 80 may be located in one general area of the display or in different portions (mode images 80 and 81) of the display.

To use the display 50 as a true-touch interface, the user simply touches the display 50 at the location of the desired mode of operation image 80 or 81 and the operation is executed.

Figure 4A:
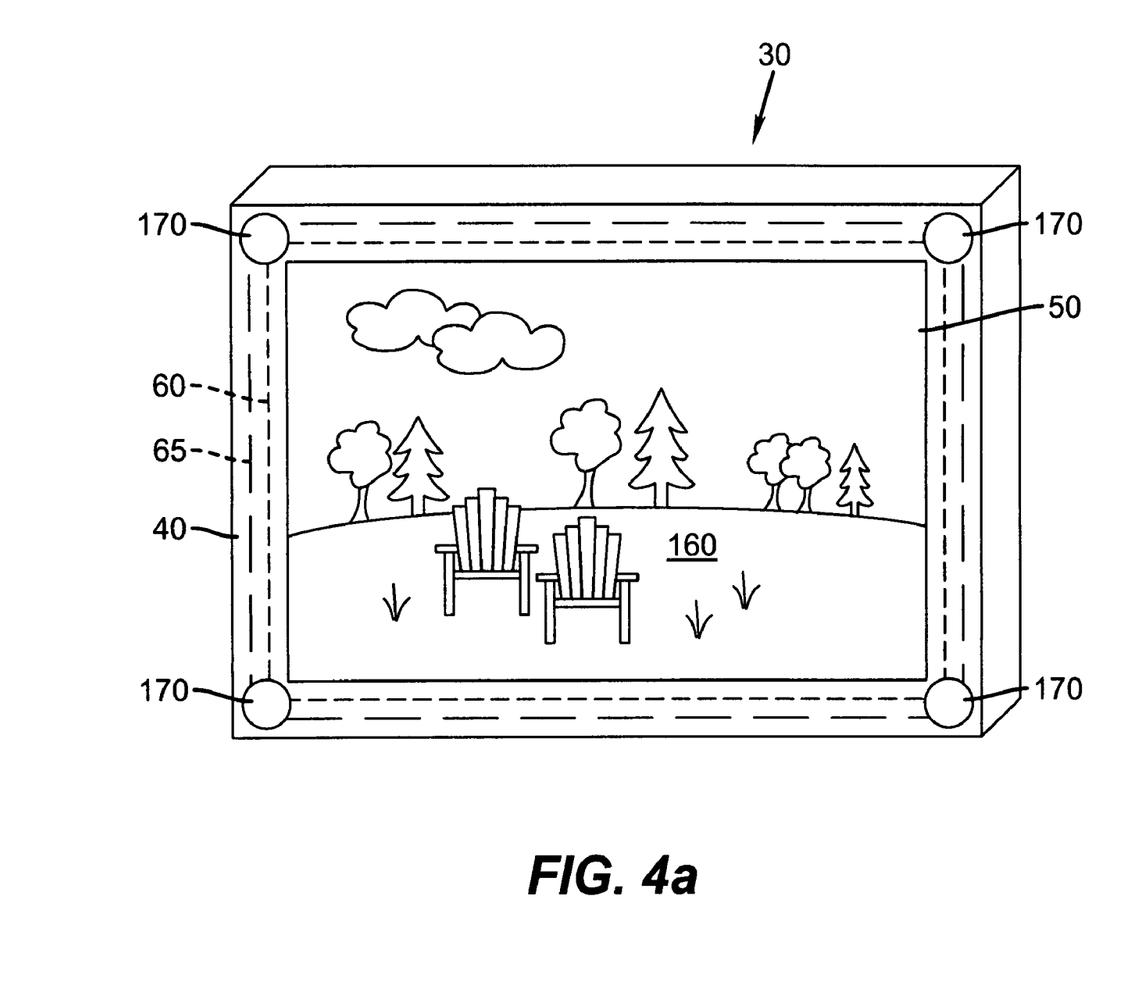
FIGS. 4a and 4b illustrate displaying the front and back side of an image.
Figure 4B:
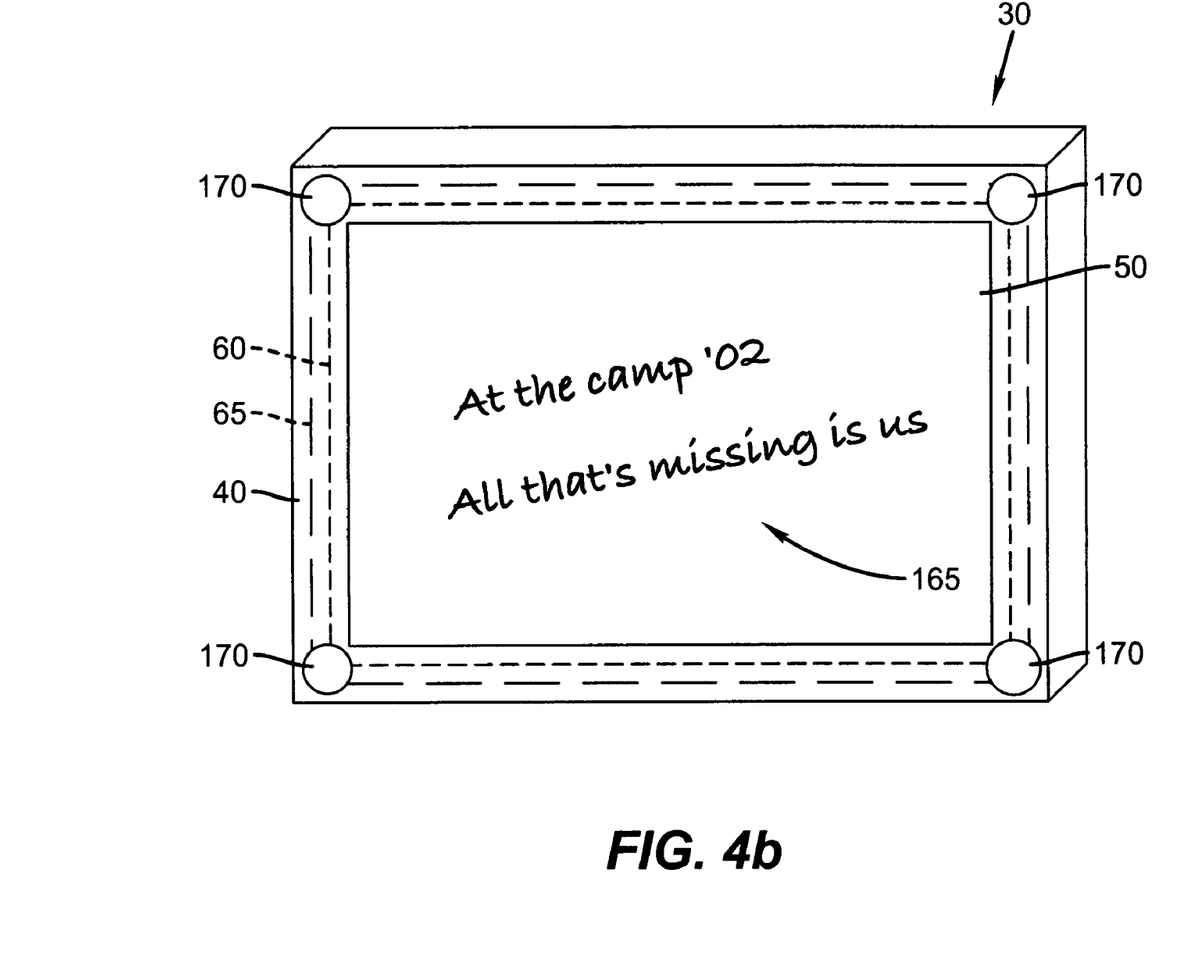

To use the border 40 as a true-touch interface, contact sensors (described in reference to FIG. 4) are disposed on the border region within the housing 30. Such contact sensors are well known and will not be discussed herein. To use the border true-touch interface, the user physically touches the border 40 directly below the mode images 80 (if they are located in the lower left corner) or above the mode images 81 (if they are located in the upper right corner) for executing the desired mode of operation. Lights may be displayed through the border 40 directly below the mode of operation (for mode images 80) and directly above the mode of operation (for mode images 81) to facilitate identifying the region of the border 40 to be touched.

Referring to FIG. 2, there is shown a back view of the digital picture frame 10. The housing 30 includes a back panel 75 having a protruding portion 90 that encloses a processor 100 that performs processing for the digital picture frame 10. A recess 110 is disposed in the protruding portion 90 in which a memory device 120, such as an SD memory card, may be inserted. The memory device 120 stores digital assets such as music, images, and videos, and the processor 100 directs the display 50 to display the assets from the memory device 120 on the display 50. A power cord 130 extends from the housing 30 and passes electrical power to the digital picture frame 10 from an electrical power source. A retractable and extendable leg 140 extends from the housing 30 for permitting the digital picture frame 10 to be positioned in a standing upright position on a flat surface, such as a desk. There are other features, such as speakers for audio and the like, which will not be described in detail herein, but are noted for clarity in understanding that other well-known features may be incorporated but are not necessarily described herein.

Referring back to FIG. 1, the operation of the picture frame 10 of the present invention is described. It is noted for clarity that the power cord 130 is plugged into a power outlet for supplying power to the digital picture frame 10, a memory card 120 is inserted into the recess 120, and images and/or videos (with associated sound played through speakers) are being displayed on the display 50. A user approaches and extends their hand within the predetermined spatial region of the digital picture frame 10. The near-touch user interface component senses the hand, and the processor 100 directs a plurality of modes of operation images 80 and/or 81 to be displayed on the display 50. The user then uses the true-touch user interface component of the border 40 or the display 50 as described above to execute the desired mode of operations.

Figure 3:
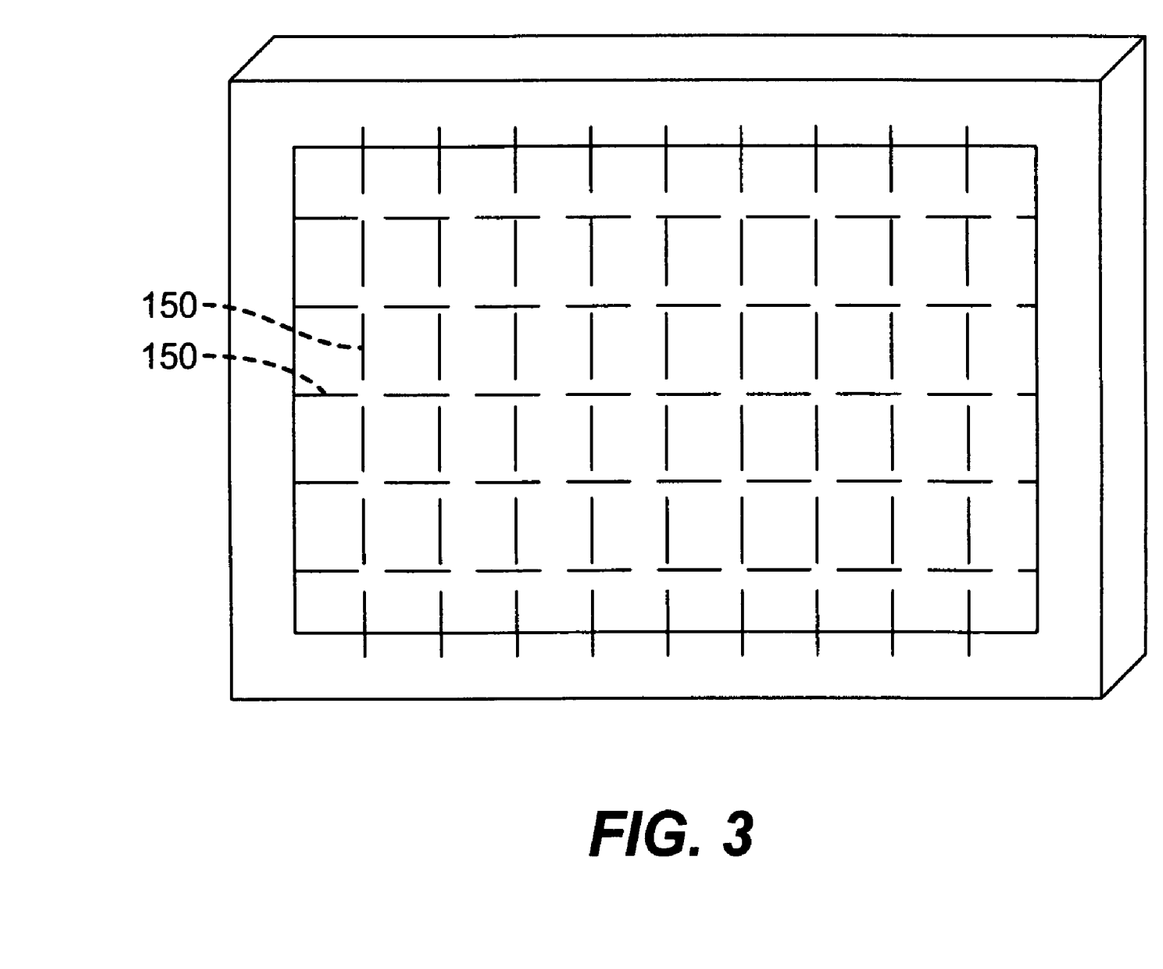
FIG. 3 is an alternative embodiment of FIG. 1.

Referring to FIG. 3, there is shown an alternative embodiment for the near-touch user interface component. In this regard, a plurality of wires 150 is disposed in a grid array along the back panel 75 so that a plurality of zones is created. The wires 150 function similarly to the one wire described above in that a change in electric and/or magnetic field is sensed. However, the grid of wires 150 permits movement to be sensed as the hand moves past a zone within the grid such as hand gestures. In this regard, the hand gestures may include a horizontal swipe for content scrolling; a vertical swipe for zoom in/out; a vertical swipe for change in duration of viewed content; a rotation for re-starting a content viewing/playback experience; a rotation for content jogging/scanning; a longitudinal push to pause the current experience; an arbitrary motion to switch/wake from a hibernation mode to an active display mode. Each wire 150 senses the movement and this permits the processor 100 to interpret the desired mode of operation based on the designated meaning of the particular hand gesture.

As a means of confirming for the user that their gesture has been properly received and interpreted, the display 50 may provide visual feedback about the input signals that have been received and/or the device controls being executed. As one example, the mode of operation image 80 or 81 displayed on the display 50 may be shown to be depressed when a longitudinal push is detected in the corresponding spatial region. As a second example, a digital streak may appear across the spatial region corresponding to a detected swipe.

The combination of near-touch and true-touch interfaces in a picture frame enables a number of interface modes. In particular, these interfaces can be used in a manner specific to image display. As shown in FIGS. 4a and 4b, images that have been scanned from prints that have both a front image 160 and a back non-image side 165. The method of accessing the non-image side 165 can be simplified by using the near-touch interface represented by wires 60 and 65 in conjunction with true-touch corner contacts 170. While viewing images, when one of true-touch corner contacts 170 is touched by an appendage, the user then moves their appendage laterally along the surface of housing 30 away from the corner of housing 30 which motion the near touch interface detects. This activity by the appendage symbolically represents motion by which a physical print is grabbed and turned electronically. The motion after touching true touch contact 170 is detected by the near-touch interface, and processor 100 instructs the display 50 to show the reverse side of the scanned print, which is non-image side 165.

Alternatively, a sequence of images simulating turning the print over can be shown. In this manner, even the scanned edges of the print can be shown such that better realism is conveyed, and a sense of the age of the print is conveyed by showing these scanned edges. The edge may be the actual edge as scanned, or a simulated edge of the type associated with the scanned print.

Figure 5:
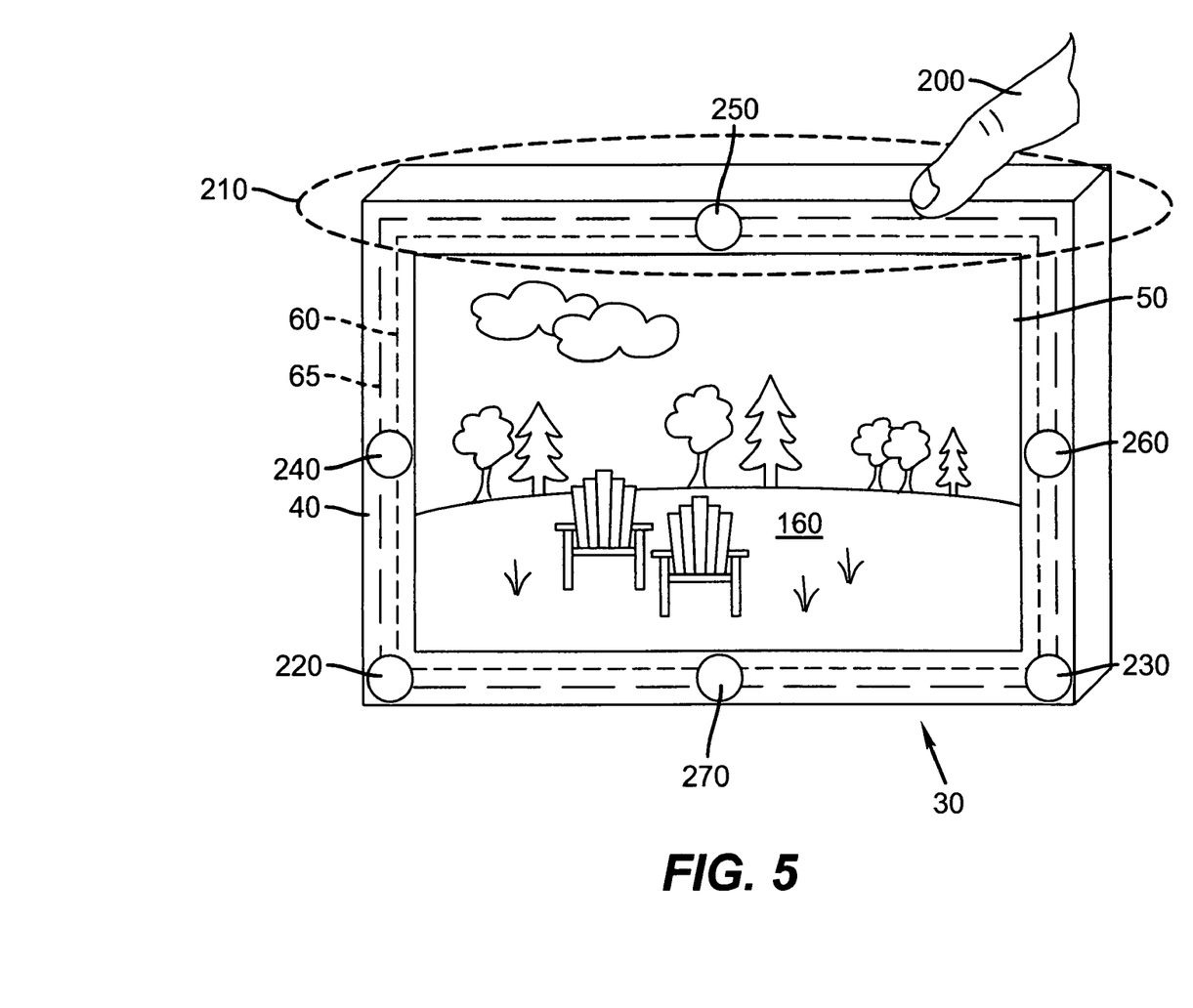
FIG. 5 illustrates the detection of an appendage by the near-touch interface in a particular zone and the corresponding mapping of the true-touch interface based on the near-touch zone.
Figure 6:
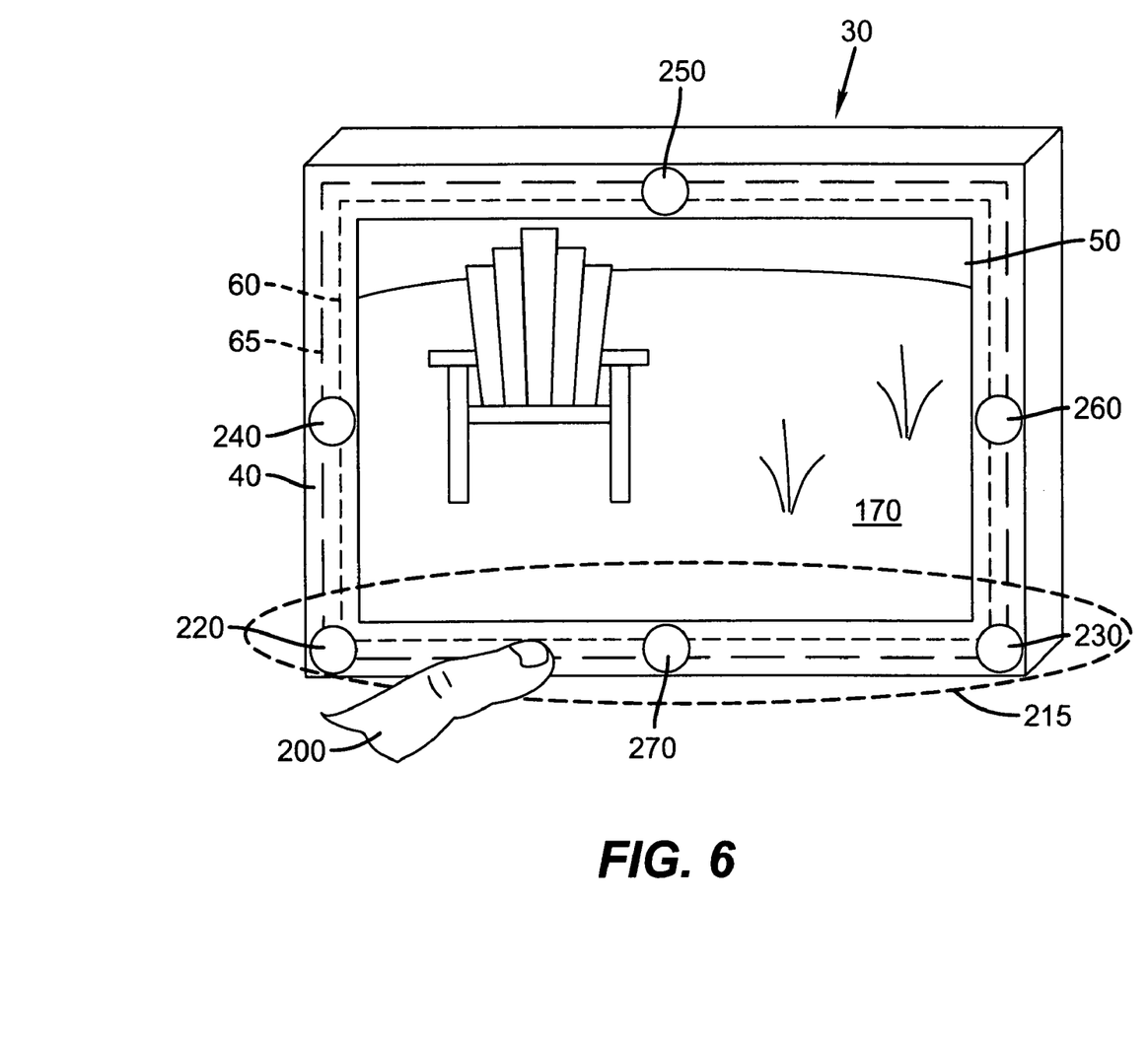
FIG. 6 illustrates detection of the near-touch interface in another zone and the corresponding re-mapping of the true-touch interface based on the near-touch zone.

The functions of the true-touch interface can be reassigned on the basis of near touch input. For example, if the near-touch interface detects a finger near the upper zone of the display frame, one set of functions can be mapped to the true-touch interface. If the near-touch interface detects a finger near the lower zone of the display frame, a second set of functions can be mapped to the true-touch interface. This functional mapping remains the same as long as there is not contrary indication to the near-touch interface, such as detecting a finger for a number of seconds in a different zone than the current without input to the true-touch interface. A zone can be any subset of the entire area detected by the near-touch interface. As shown in FIG. 5, finger 200 is in upper zone 210 of the near touch interface and true-touch interface contacts 220 and 230 are respectively mapped to the functions of previous image and next image. True-touch interface contacts 240, 250, 260 and 270 are unassigned. As shown in FIG. 6, when finger 200 is in lower zone 215 of the near touch interface, true-touch interface contacts 220 and 230 are respectively mapped to the functions of zoom in and zoom out. True-touch interface contacts 240, 250, 260 and 270 are respectively assigned to pan left, pan up, pan right, and pan down.

Figure 7:
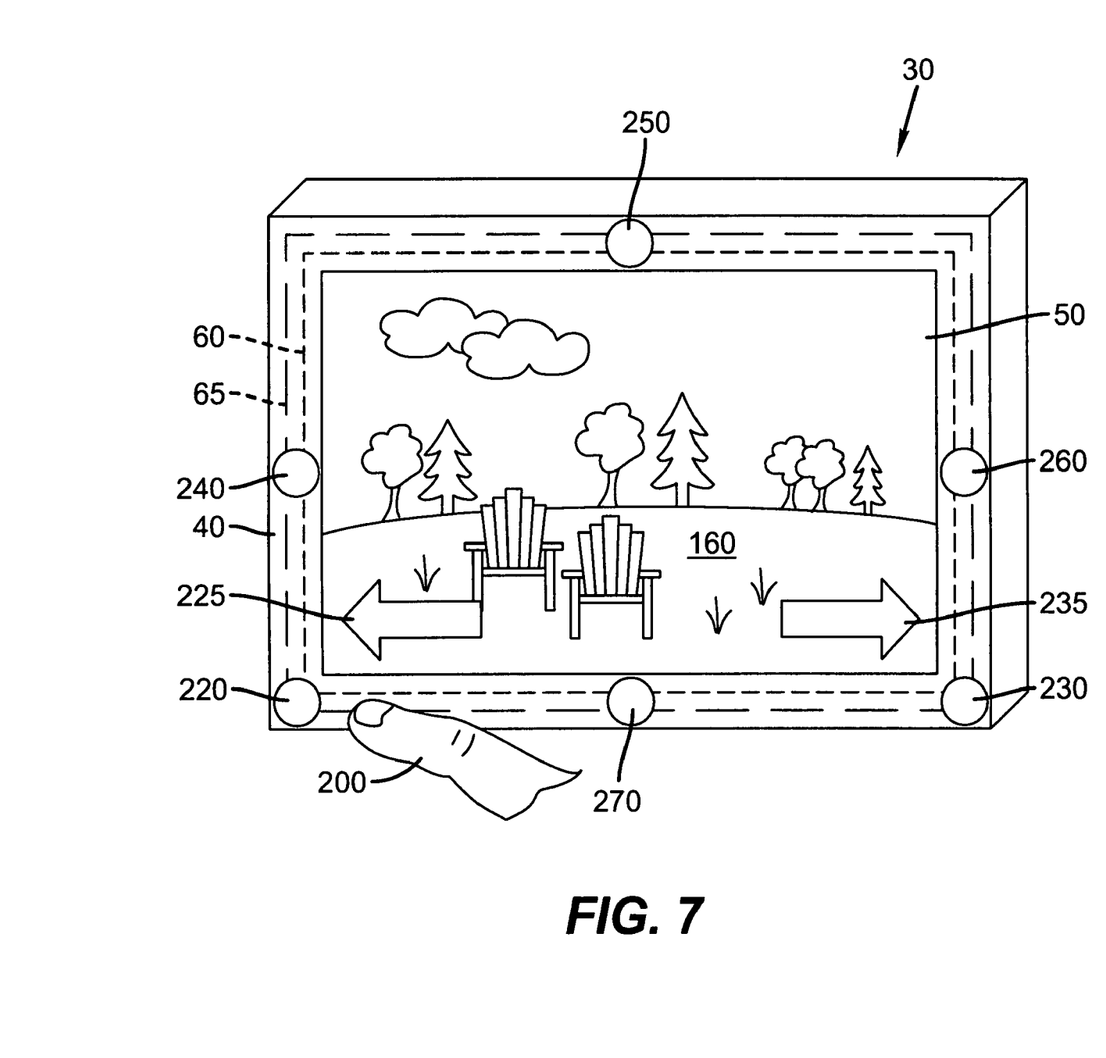
FIG. 7 illustrates the highlighting of the true-touch interface functions when an appendage is in a particular zone.

The near-touch and true-touch interfaces are used in conjunction with the display 50 to simplify the user interface. For example, when the near-touch interface senses that a body part, such as a finger, is in proximity to a specific portion of the true-touch interface, the display 50 may highlight the function of that portion of the true-touch display 50 prior to any contact. This can be done as shown in FIG. 7 by showing text or icons describing the function on the portion of the display 50 near the true-touch contact corresponding to that function. Not only is the function called out, but it is also highlighted in a manner such as blinking, color changes, size changes, or other methods of highlighting well known in the art. Additionally, not only the function proximal true touch portion may be highlighted, but related portions of the true-touch interface that are not proximal may also be highlighted. Finger 200 is approaching true-touch interface contact 220, and icon 225 for the previous image function of contact 220 appears on the portion of the display 50 near the true-touch contact 220 and also can be highlighted. The icon 235 associated with the next image function of true-touch contact 230 is also highlighted even though finger 200 is not proximal to contact 230. These methods provide the advantage of an uncluttered visual representation. Note that icons and/or text for functions can be displayed in such a manner that the same space on the display can be used for different functions. The icons and/or text can be shown much larger than if all the icons and/or text shared the space at the same time.

Figure 8A:
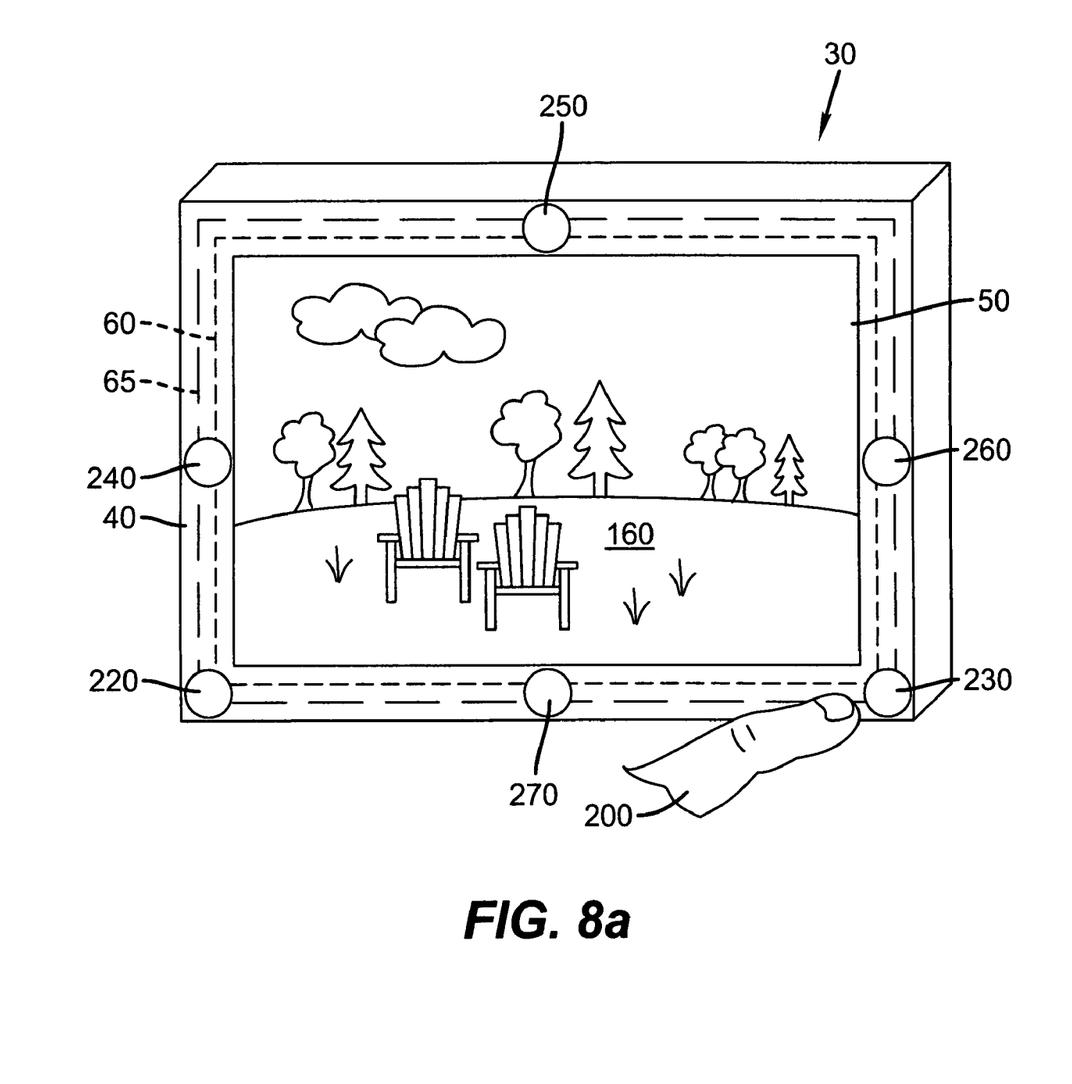
FIGS. 8a and 8b illustrate the interaction of the near-touch and true-touch interfaces to modify functionality increments of the displayed images.
Figure 8B:
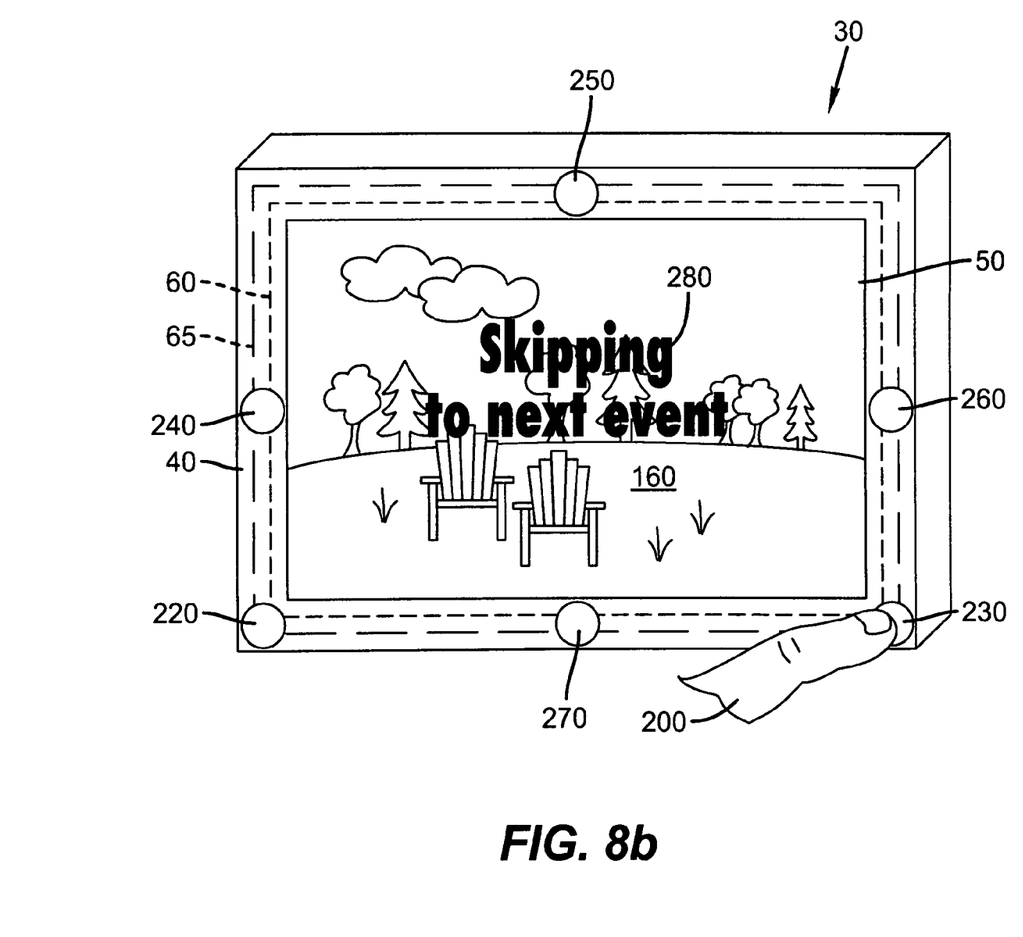

The combination of near-touch and true-touch interfaces in a picture frame can also be used to implement an interface where predetermined increments or matters of degree are easily enabled and communicated. FIG. 8a shows finger 200 in the near-touch zone associated with the right portion of the frame. When finger 200 is detected in this zone, the display frame advances the image displayed to the next image. FIG. 8b shows finger 200, still in the near-touch zone associated with the right portion of the frame, but finger 200 has now made contact with the contact 230 of the true-touch interface. By detecting that finger 200 has continued to be in the same near-touch zone and has made contact with contact 230 as shown in FIG. 8b, this contact is interpreted as a desire on the part of the user for a different degree of the function "next image." Frame 10 displays multiple next images at a fast rate, or skips to the 10$^{th}$ image, or moves to the next group of images as defined by event grouping of the type described by Loui in U.S. Pat. No. 6,351,556 which is included herein by reference. Text 280 indicates that the different degree is achieved.

The invention has been described in detail with particular reference to certain preferred embodiments thereof, but it will be understood that variations and modifications can be effected within the spirit and scope of the invention.

PARTS LIST

10 digital picture frame
30 housing
40 front portion/border
50 display
60 wire
65 second wire
70 user interface/knob
75 back panel
80 mode images
81 mode images
90 protruding portion
100 processor
110 recess
120 memory device
130 power cord
140 leg
150 plurality of wires
160 front side
165 back side
170 contacts
200 finger
210 upper zone
215 lower zone
220 true-touch contact
225 icon
230 true-touch contact
235 icon
240 true-touch contact
250 true-touch contact
260 true-touch contact
270 true-touch contact
280 text

The invention claimed is:

1. A digital picture frame comprising:
   (a) a display for displaying one or more images;
   (b) a near-touch user interface component that senses when an object is within a predetermined spatial region of the digital picture frame;
   (c) a true-touch user interface component that senses physical contact with the digital picture frame; and
   (d) a processor that receives input signals from the near-touch user interface component and the true-touch user interface component and executes device controls based on inputs from both user interface components.

2. The digital picture frame as in claim 1, wherein the predetermined spatial region is detected relative to a point on a border and/or the display.

3. The digital picture frame as in claim 1, wherein the predetermined spatial region is adjustable.

4. The digital picture frame as in claim 1, wherein the input signals from the near-touch user interface component are sensitive to zones of different longitudinal distances and/or lateral positions.

5. The digital picture frame as in claim 4, wherein the longitudinal distances are between 1-2 inches.

6. The digital picture frame as in claim 4, wherein the lateral positions are limited to the lateral dimensions of a border and/or the display.

7. The digital picture frame as in claim 4, wherein the lateral positions are arranged in a two-dimension pattern.

8. The digital picture frame as in claim 4, wherein at least one device control is triggered by the input signals from the near-touch user interface component detected in a single zone.

9. The digital picture frame as in claim 4, wherein at least one device control is triggered by the input signals from the near-touch user interface component detected in at least two zones.

10. The digital picture frame as in claim 9, wherein the set of input signals and corresponding device controls includes at least one of the following: horizontal swipe for content scrolling; vertical swipe for zoom in/out; vertical swipe for change in duration of viewed content; rotation for re-starting a content viewing/playback experience; rotation for content jogging/scanning; longitudinal push to pause current experience; arbitrary motion to switch/wake from a hibernation mode to an active display mode.

11. The digital picture frame as in claim 1, wherein the input signals from the near-touch user interface component are received first and used to display mode options on the display that are executed when the proper input signals from the true-touch user interface component are received.

12. The digital picture frame as in claim 11, wherein the mode corresponds to one of the following types of content: personal imaging content; entertainment content; Infotainment content.

13. The digital picture frame as in claim 11, wherein the mode information includes at least one image or icon corresponding to a specific control.

14. The digital picture frame as in claim 1, wherein the display provides visual feedback about the input signals that have been received.

15. The digital picture frame as in claim 1, wherein the display provides visual feedback about the device controls being executed.

16. The digital picture frame as in claim 1, wherein the near-touch interface and the true-touch interface are used in sequential combination to enable a functionality of the digital picture frame.

17. The digital picture frame as in claim 16, wherein the combination of near-touch interface and true-touch interface are used to display a front and back side of an image on the display.

18. The digital picture frame as in claim 16, wherein an edge of an image is displayed on the display.

19. The digital picture frame as in claim 16, wherein the true-touch interface is engaged first and the near-touch interface is engaged second.

20. The digital picture frame as in claim 16, wherein the near-touch is first engaged in a particular zone and the true-touch interface responds based on the particular zone engaged by the near-touch interface.

21. The digital picture frame as in claim 20, wherein the true-touch interface is highlighted.

22. The digital picture frame as in claim 21, wherein the true-touch interface includes designated functions that are initiated based on the particular zone engaged by the near-touch interface.

23. The digital picture frame as in claim 16, wherein the near-touch interface initiates a first function of the picture frame when engaged and the true touch interface initiates a second function when engaged sequentially after engaging the near-touch interface.

24. The digital picture frame as in claim 1, wherein a first desired function is indicated by detection of an appendage in a zone of the near touch interface, and a related desired function is indicated by contact by the appendage with the true touch interface within said zone.

25. The digital picture frame as in claim 1, wherein functions of a true touch interface are assigned based on detection of an appendage within a zone of the near-touch interface.

26. The digital picture frame as in claim 1, wherein functions of a true touch interface are reassigned based on detection of an appendage within a second zone of the near-touch interface.

27. The digital picture frame as in claim 1, wherein functions of a true touch interface are indicated based on detection of an appendage within a zone of the near-touch interface, and related functions not within said zone are also indicated.

* * * * *